United States Patent [19]
Fry et al.

[11] 4,084,102
[45] Apr. 11, 1978

[54] WIND DRIVEN, HIGH ALTITUDE POWER APPARATUS

[76] Inventors: Charles Max Fry, 17144 E. Brown Cir., Aurora, Colo. 80013; Henry W. Hise, 2209 Hancock Dr., Austin, Tex. 78756

[21] Appl. No.: 650,186

[22] Filed: Jan. 19, 1976

[51] Int. Cl.² .............................................. F03D 11/00
[52] U.S. Cl. ....................................... 290/55; 416/85
[58] Field of Search ................................. 290/54–55, 290/43–44; 415/2–4, 7, 85; 244/33; 416/176, 85

[56] References Cited

U.S. PATENT DOCUMENTS

| | | | |
|---|---|---|---|
| 1,371,836 | 3/1921 | Antz | 416/85 |
| 2,218,867 | 2/1938 | Beldimano | 290/55 |
| 2,431,111 | 11/1947 | Brie | 290/55 |
| 2,433,344 | 12/1947 | Crosby | 244/33 |
| 3,229,517 | 1/1966 | Smith | 244/33 |

FOREIGN PATENT DOCUMENTS

| | | | |
|---|---|---|---|
| 11,193 of | 1911 | United Kingdom | 244/33 |
| 489,139 | 7/1938 | United Kingdom | 415/7 |

*Primary Examiner*—James R. Scott
*Assistant Examiner*—Michael Mutter
*Attorney, Agent, or Firm*—Marcus L. Bates

[57] ABSTRACT

Wind driven rotors are affixed along the length of a flexible power shaft, and the shaft is suspended at a great height above the earth by means of a swivel. The lowermost end of the shaft is connected to rotate a ground supported energy conversion device. The winds aloft impart rotational motion into the wind rotors, whereupon the rotational energy of the shaft is converted into electrical power or other form of power by the conversion device.

The swivel enables the rotating shaft to be affixed to a nonrotating lifting or suspension device. The lifting device includes lighter-than-air lifting bodies, aerodynamic lifting bodies, as well as a combination thereof. In one embodiment of the invention, a plurality of lifting bodies suspend a plurality of wind rotors, with each of the rotors being affixed to the shaft by a clutch means, so that when a wind gradient is encountered, a slowly rotating rotor will become disengaged from the shaft, thereby avoiding induced drag of the slow rotor.

8 Claims, 11 Drawing Figures

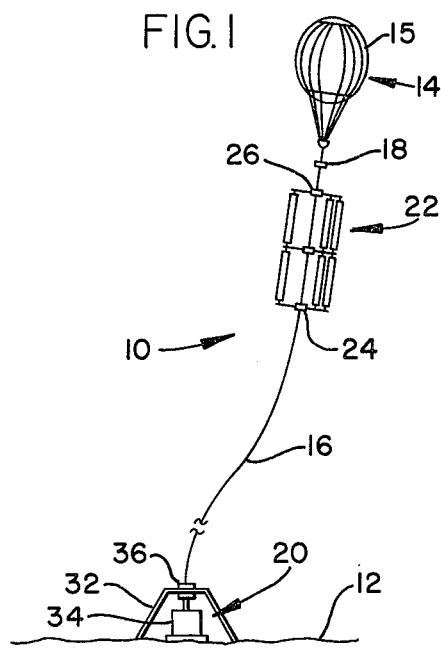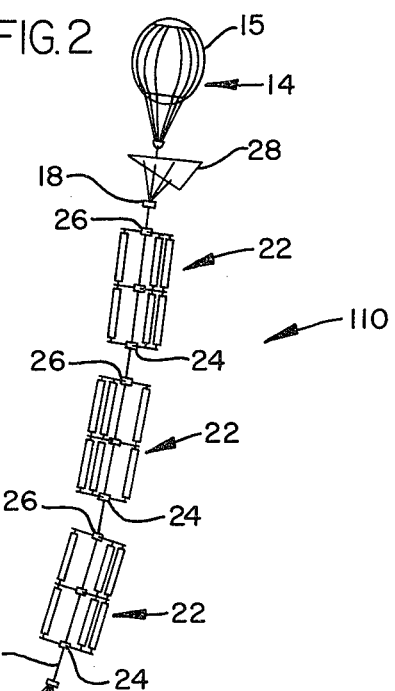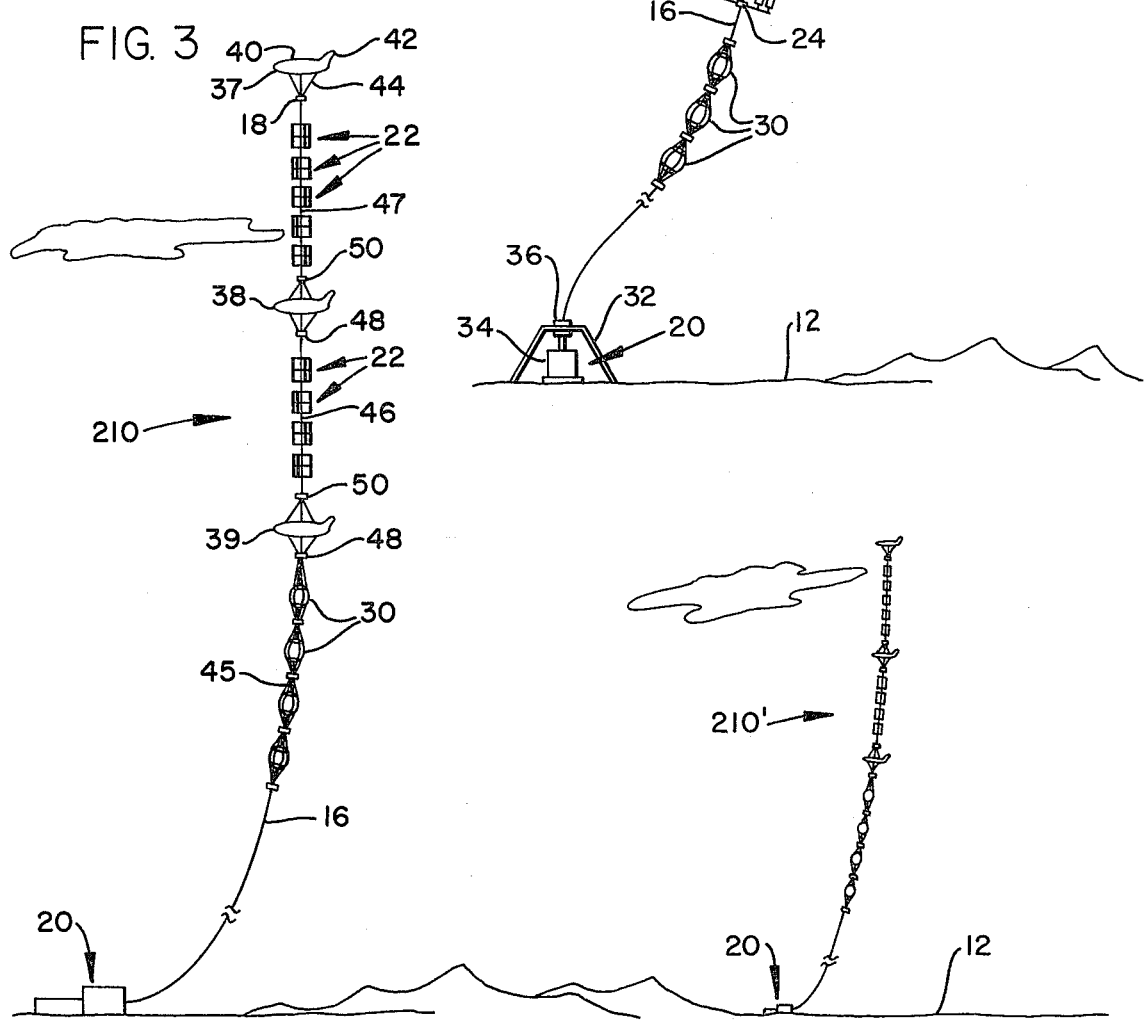

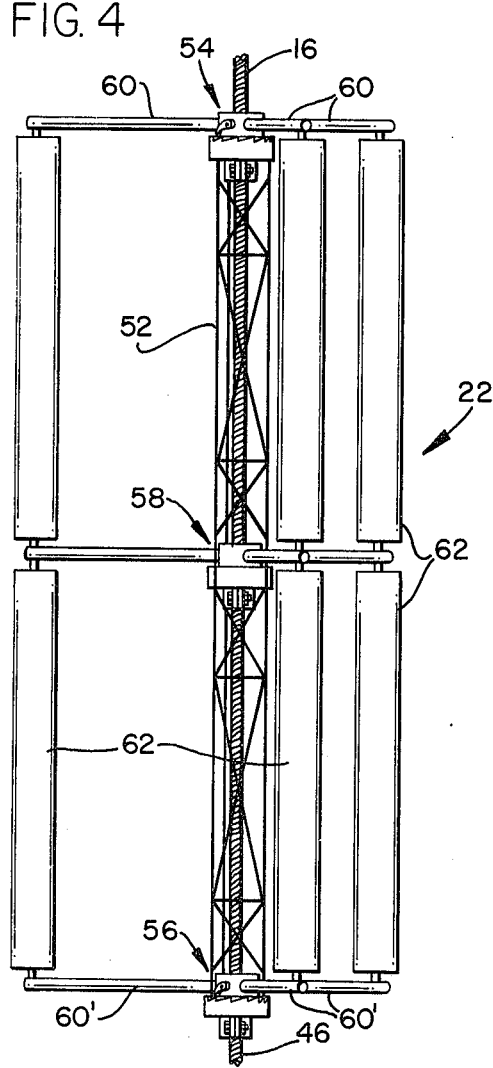
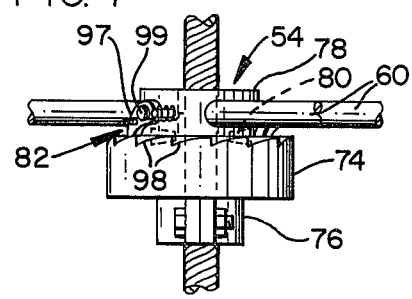
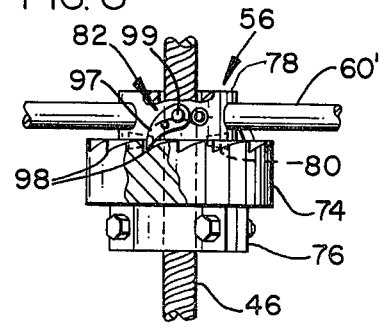
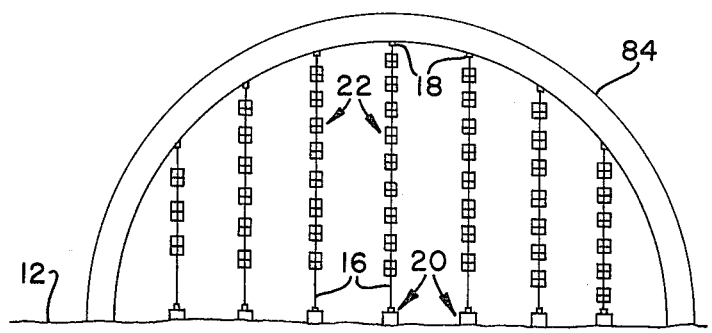
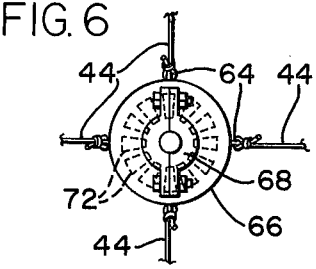

WIND DRIVEN, HIGH ALTITUDE POWER APPARATUS

RELATED PRIOR ART

British patent specification—No. 489,139
Beldimano U.S. Pat. No.—1,876,595
Beldimano U.S. Pat. No.—2,218,867
Lubash U.S. Pat. No.—3,086,738
Smith U.S. Pat. No.—3,229,517
Strickland U.S. Pat. No.—3,743,848.

BACKGROUND OF THE INVENTION

The bulk of the wind energy available in the atmosphere is found at altitudes which are not feasible for reaching with tower structures. Hence, the cost of harvesting high altitude energy with wind rotors attached to towers is prohibitive. The present invention vastly reduces the cost of harvesting high altitude wind energy by the provision of a wind rotor attached to a flexible shaft and suspended at great heights above the earth by a lifting body.

Nature has provided a few isolated instances wherein spaced mountain ranges extend thousands of feet above a valley floor, with the mountain peaks or parts thereof being placed in close proximity to one another to enable a cable way to be built thereacross so that the cable can be suspended at a great altitude above the valley floor. Usually, prevailing winds will travel at high velocity between the suspended cable and the valley floor.

Gries (British patent specification No. 489,139) discusses the suspension of a wind driven generator, or dynamo, from captive balloons or kites and transmitting the generated electricity to the surface of the ground. Hence, the lifting body employed by Gries must lift an enormous weight in order that appreciable power may be produced by his dynamo.

Beldimano proposed a suspension cable between spaced towers with a plurality of vertical wind wheels being connected to vertically disposed girders. Each of the girders comprises spaced structure for supporting a wind wheel. The wind wheel reciprocatingly drives a power rod. The load imposed upon the suspension cables and the complexity of the system is substantial.

Smith has proposed the use of a plurality of aerial support means which include gas filled balloons, as well as gas filled aerodynamic lifting devices. The aerodynamic lift augments the buoyant lift of the gas contained therewithin. Smith further proposed augmenting the gas lift with a kite.

Accordingly, the prior art teaches the use of various free aerial lifting bodies, as well as the use of ground supported, stationary structures in order to suspend a generator device within the atmosphere by which power can be generated and transmitted to the surface of the earth. Usually, the generator device is directly attached to the aerial support means, and electrical conductors are run downwardly to the surface of the earth. Others propose suspension of a wind rotor which reciprocates a rod so that a ground supported generator can be actuated. In each of the before mentioned inventions, a tremendous mass must be lifted into the air; and accordingly, each of the prior inventions must be practiced near the surface of the earth. Therefore, the advantage of high altitude wind energy is lost.

SUMMARY OF THE INVENTION

A high altitude, wind driven, power producing apparatus comprising an aerial support means by which a wind rotor is lifted into and suppported within the atmosphere. The wind rotor is journaled to the support means by a swivel means so that the rotor can rotate respective to the support means. An elongated, flexible drive shaft has an upper end thereof affixed to the wind rotor and the remaining lower end thereof connected to drive a ground supported, energy conversion device, as for example an electrical generator.

In one embodiment of the invention, the aerial support means comprises a lighter-than-air lifting device. The lifting device includes a plurality of gas filled enclosure means, such as a balloon. One enclosure means is in the form of a lifting body having a suitable aerodynamic configuration for producing lift by thereby augment the lifting force provided by the lighter-than-air gas. The magnitude of the aerodynamic lifting force is therefore proportional to the square of the resultant wind speed.

In another embodiment of the invention, natural and man-made structure supports the swivel means, and a plurality of wind driven rotors are disposed along a drive shaft located therebelow.

In still another embodiment of the invention, a plurality of wind driven rotors are employed, with the rotors being spaced apart an appreciable amount. A clutch means is interposed between the rotor and the drive shaft so that when a wind gradient of a large magnitude is encountered, a slow turning rotor positioned within the relatively low velocity wind will automatically be disengaged from the drive shaft, thereby avoiding induced drag respective to the shaft and to the rotors which are positioned within the relatively high velocity wind.

Accordingly, a primary object of the present invention is the provision of a method of collecting wind energy using a wind rotor connected mechanically to a drive shaft and suspended within the atmosphere.

A further object of the present invention is the provision of apparatus for collecting wind energy by a wind driven rotor supported above the earth and connected mechanically to drive a flexible power shaft, with the shaft having the lowermost end thereof connected to a ground supported energy conversion device.

A still further object of this invention is to provide both method and apparatus for harvesting atmospheric wind energy by lifting a wind driven rotor aloft into the atmosphere and driving a ground supported energy conversion device with the rotor by means of a flexible drive shaft, and using the shaft to anchor the rotor to the energy conversion device.

Another and still further object of this invention is the provision of a method of collecting and transmitting to the ground wind energy in mechanical form by the use of wind driven rotors suspended within the atmosphere.

An additional object of the invention is to provide a wind driven power apparatus which enables harvesting high altitude wind energy.

Another object of the invention is the provision of a high altitude, wind driven, power producing apparatus by which energy derived from high altitude winds is mechanically transmitted to a ground supported energy conversion device.

These and various other objects and advantages of the invention will become readily apparent to those skilled in the art upon reading the following detailed description and claims and by referring to the accompanying drawings.

The above objects are attained in accordance with the present invention by the provision of method for use with apparatus fabricated in a manner substantially as described in the above abstract and summary.

BRIEF DESCRIPTION OF THE DRAWINGS

FIG. 1 is a part diagrammatical, part schematical illustration of a simplified embodiment of the present invention;

FIG. 2 is similar to FIG. 1 and sets forth another embodiment of the present invention;

FIG. 3 is a diagrammatical view which sets forth still another embodiment of the present invention;

FIG. 4 is an enlarged, side elevational detail of part of the apparatus disclosed in the foregoing figures;

FIG. 5 is an enlarged, detailed view of part of the apparatus disclosed in FIG. 3;

FIG. 6 is a top plan view of the apparatus disclosed in FIG. 5;

FIG. 7 is an enlarged detail of part of the apparatus disclosed in FIG. 4;

FIG. 8 is a fragmentary, part cross-sectional illustration of part of the apparatus disclosed in FIG. 7;

FIG. 9 is a side elevational view of still another embodiment of the present invention;

DETAILED DESCRIPTION OF THE PREFERRED EMBODIMENTS

Figure 10:
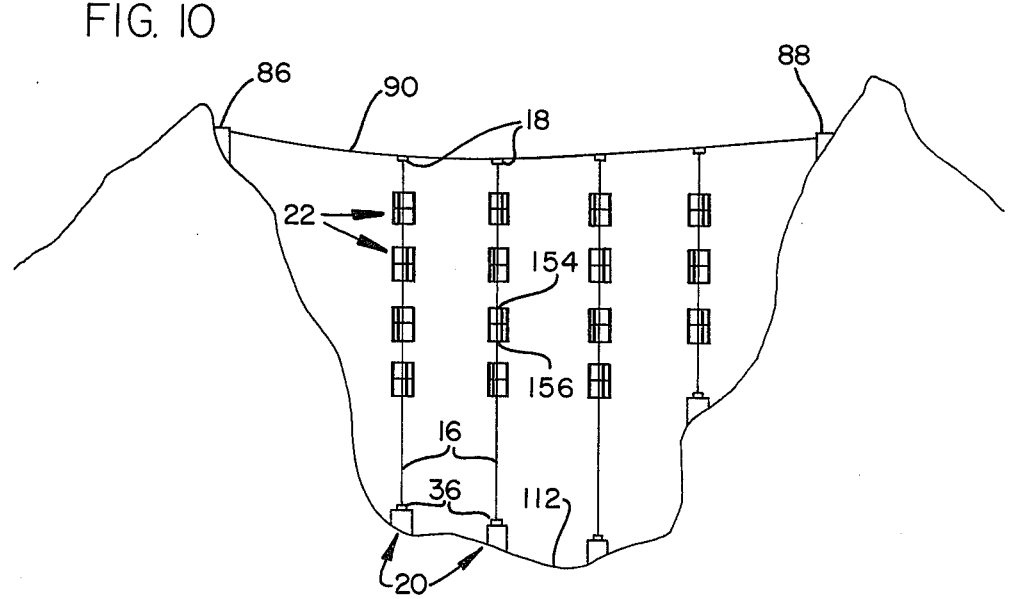
FIG. 10 is an elevational view of still another embodiment of the present invention; and, FIG. 11 is an elevational view of still another embodiment of the invention.

In the simplified embodiment of FIG. 1, there is disclosed a wind driven, high altitude power apparatus 10 made in accordance with the present invention. The apparatus is tethered to the ground 12 and includes an aerial support means 14 which is broadly illustrated as being in the form of a lighter-than-air, gas filled balloon 15. A drive shaft 16 of relatively flexible material has an uppermost end portion thereof connected to a swivel means 18. The swivel means permits relative rotation between the shaft and the aerial support means. A ground supported energy conversion device, such as a power generator 20, for example, is connected to be driven by the lowermost end of the shaft. Hence, the shaft drives the generator and also tethers the aerial support means to the ground.

A wind driven rotor 22 is affixed to the shaft by any convenient means at 24 and 26 so that the winds aloft impart a rotating motion into the rotor, while the rotor imparts rotational motion into the shaft, thereby enabling the shaft to impart rotational motion into the ground supported generator, whereupon energy is harvested from the winds aloft.

In the embodiment of the invention disclosed in FIG. 2, the before mentioned aerial support means is illustrated as being in the form of the before mentioned, lighter-than-air, gas filled enclosure 15 in combination with an aerodynamic lifting body 28. The lifting body 28 is aerodynamically shaped so that the relative wind blowing thereacross imparts a lifting force into the body to thereby augment the lifting force provided by the balloon 15. Preferably, the lifting body 28 is a gas filled enclosure means which provides a buoyant force sufficient to at least support itself under a no-wind condition. Swivel 18 underlies the body 28 so that a plurality of wind driven rotors 22 can rotate respective to the support means.

A substantial portion of the lower marginal end of the power shaft is positioned within the low wind region of the atmosphere, and therefore is devoid of wind rotors. Instead, the shaft has attached thereto a plurality of dampeners 30 in the form of spaced apart dampening balloons, which are of relatively small diameter respective to the lifting balloon. Other design configurations may use guy wires to stabilize or position the apparatus.

A drive shaft guide 32 connects the lowermost end of the power shaft to a rotatable energy conversion device 34. Numeral 36 indicates the attachment means between the shaft 16 and the input shaft of the energy conversion device 34, which may include an electrical generator. There are ample prior art expedients available to achieve suitable attachment of the two shaft ends.

In the embodiment of the invention disclosed in FIG. 3, the aerial support means comprises a plurality of gas filled, aerodynamically shaped bodies 37, 38, and 39. Each body is made in the form of a streamlined hull 40, similar to a dirigible, and includes a stabilizer or rudder 42 positioned at the trailing end portion thereof so that the body tends to remain oriented into the wind for achieving maximum lift therefrom. A bridle 44, made of lightweight material, suitably connects the lifting body to the before mentioned swivel. The power shaft is comprised of shaft lengths 45, 46, and 47, which preferably are in a series of connected lengths of shaft, or alternatively may be one continuous length of shaft. A plurality of wind driven rotors are spaced along each of the shaft lengths, save the lowermost shaft length 45. The shaft lengths 46 and 47 are connected to one another and effectively rotatably extend through the lifting body 38 by means of a pair of opposed bearing members positioned at 48 and 50, while shaft lengths 45 and 46 effectively rotatably extend through lifting body 39 by a similar set of bearing members. Hence, swivel 18 connects lifting body 37 to the uppermost end of the driven or power shaft, while bearing members 48 and 50 journal the lifting body 38 to the shaft. The lifting body 39 is rotatably connected in a similar manner to the lower marginal portion of the drive shaft. Although the shaft lengths 45, 46, and 47 may be various different diameters and lengths of shaft material connected together, nevertheless the shaft is essentially comprised of a continuous length of relatively flexible material effectively extending from swivel 18 to the energy conversion device.

The arrow at numeral 210' in FIG. 3 illustrates a second wind driven, power producing apparatus which is substantially identical to the disclosure indicated by numeral 210. Hence, any number of high altitude, wind driven power apparatus can be positioned in relatively close proximity of one another.

FIG. 4 is an enlarged detail which illustrates one form of the wind driven rotor 22, and which is diagrammatically illustrated in the various other figures of the drawings. As seen in FIG. 4, together with FIGS. 7 and 8, the rotor comprises an elongated, vertically disposed, central structure 52 having shaft engaging hub members, 54 and 56, located at each opposed end thereof; the details of which are more fully described in FIGS. 7 and 8. Radially spaced apart arms 60 or 60' are attached to and radiate from the hub members 54, 56, and 58. The arms jointly support the radially spaced blade members 62 at the free terminal end portion thereof. Various guy wire may be advantageously employed to truss the entire structure as may be required for adequately supporting the huge blades.

FIGS. 5 and 6 illustrate the details of the swivel 18 by which the upper shaft end is journaled to the aerial support means. The before mentioned bridle 44 is comprised of guy wires which terminate is attached relationship respective to a non-rotatable base member 66. The base member is counterbored at 67 and rotatably receives the shaft therethrough with the shaft being affixed to a rotatable bearing member 68. Member 68 is rigidly affixed to member 70 which is supported by the upper side of the lower bearing member 66. Low friction bearing means 72 are interposed between members 66 and 70. Accordingly, members 68 and 70 are attached to and rotate with the shaft, while member 66 is non-rotatable respective to the aerial support means.

As seen in the detailed illustration of FIGS. 7 and 8, the upper and lower hub members, 54 and 56, each comprise a support member 74 which is affixed to the shaft by means of reduced diameter member 76, so that the support member is non-rotatably disposed respective to the power shaft.

Spider member 78 is affixed to the radial arms and is supported in low friction journaled relationship respective to the support member 74. Radially spaced tapered roller bearings 80 are set in a race which is circumferentially spaced from an axial, shaft-receiving bore formed through the entire hub assembly.

A ratchet member 82 cooperates with the support and spider members to form a one-way clutch, thereby permitting the spider to freely rotate respective to the support when the rotational velocity of the shaft exceeds the rotational velocity of the rotor. Hence, when the wind blows with sufficient velocity to cause the rotor to contribute power into the shaft, the clutch is engaged so that the spider is connected to the support to effectively lock the members together. The clutch means can take on any number of different forms. FIGS. 7 and 8 illustrate one simplified form of a clutch means which can be advantageously used in practicing the invention. As seen in the drawings, a pawl 97 engages a rack 98, with the pawl being journaled at pivot pin 99 and spring loaded into positive engagement with the rack so that the spider drives the support in one direction of rotation and is disengaged when the support speed exceeds the spider speed.

FIG. 9 discloses an aerial support means 84 in the form of an arch structure. The inverted "U" structure supports a plurality of drive shafts 16 by means of the swivels 18 which are directly attached to a midportion of the arch. Energy conversion devices 20 are ground supported and individually driven by the corresponding flexible shaft, which in turn is driven by the attached illustrated rotors 22.

FIG. 10 illustrates still another aerial support means by which a plurality of swivel means 18 are each individually supported at an elevated height. The aerial support means of FIG. 10 comprises spaced deadmen, 86 and 88, located atop a mountain so that a suspension means 90 can be suspended above the floor 112 of the valley. This expedient suspends the swivel means 18 at a great height within the atmosphere. Rotors 22 drive the flexible drive shaft 16, which in turn powers a plurality of spaced apart energy conversion devices 20, as in the before described manner.

Figure 11:
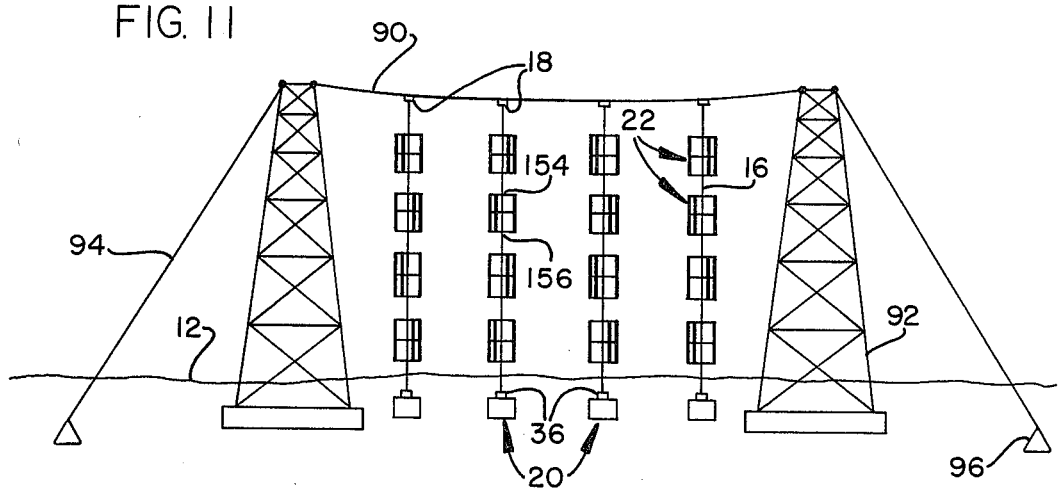

FIG. 11 illustrates still another form of the aerial support means and is comprised of a pair of spaced towers 92 having any number of spaced guy wires 94 by which the tops of the towers are firmly anchored to spaced deadmen 96. Suspension means in the form of a cable 90 is attached to the top of each of the towers and supports a plurality of spaced apart swivel means 18 therefrom. Rotors 22 are affixed to the spaced, parallel, vertically disposed drive shafts so that power can be generated at 20 as in the before described manner.

In operation of the embodiment disclosed in FIG. 1, the ballon or aerial support means is of a sufficient diameter to provide enough bouyance for lifting the accumulated weight of the swivel, rotor, and shaft to an altitude of several thousand feet so that advantage can be taken of the high velocity winds found aloft within the atmosphere. The flexible shaft maybe in the form of a wire rope having the individual wire strands thereof arranged respective to one another to minimize the possibility of the shaft being twisted upon itself; i.e., become nonlinear. The balloon is essentially non-rotatable respective to the earth; however, where a single balloon or where a symmetrical lifting device is employed, relative rotation is of less importance, as in the instance of employment of non-symmetrical lifting bodies which must be oriented into the wind.

The rotor 22 can take on any number of different forms, so long as it rotates about its longitudinal central axis, and so long as the blades are radially or circumferentially spaced from the shaft.

As the relative velocity of the winds aloft impart a turning motion into the rotor, the shaft is likewise forced to rotate about its central axis, thereby imparting rotational motion into the attached ground supported energy conversion device, which preferably generates electrical energy and therefore can have multiple uses. However, other forms of energy conversion devices may be employed at 20, while remaining within the comprehension of this invention.

The embodiment of FIG. 2 illustrates a wind driven, power producing apparatus for use at intermediate altitudes. The balloon 15 is utilized in combination with a lifting device 28 which preferably takes on the form of a kite. The kite is attached to the balloon by any suitable bridle means, while the swivel 18 is suspended in underlying relationship respective to the kite. The kite provides additional lift in order to maintain the posture of the system. Spaced wind rotors 22 underlie the swivel, and since the rotors are spaced within a relatively small distance measured along the shaft, the clutch disclosed in FIGS. 7 and 8 need not be included, because each of the rotors will usually be subjected to substantially the same wind velocity. Guy wires may also be employed to stabilize or maintain the posture of the apparatus.

In the illustrative embodiment of FIG. 3, a plurality of spaced lifting devices and groups of rotors are disposed over a considerable altitude, and therefore constitute a large-scale power application. Several different power producing apparatus can be utilized in a single geographical area as indicated by the numerals 210 and 210'. The lifting device 37 preferably is a hydrogen or helium filled, aerodynamically shaped body. The buoyant force provided by the gas contained within the lifting bodies preferably is of sufficient magnitude to support the entire system in a no-wind condition. The aerodynamic shape of each of the lifting bodies provides additional lift from the resultant forces of the winds aloft, so that as the wind velocity increases, the system is maintained in a reasonably erect position with sufficient tension being maintained in the power shaft to prevent kinking thereof. The lifting bodies each remain oriented into the wind with the uppermost lifting body preferably flying at altitudes approaching the stratosphere.

It is known that the winds aloft change direction with respect to altitude. In this respect, it is pointed out that the direction of the wind is unimportant respective to harvesting energy therefrom, because the rotors are effective regardless of the direction from which the wind blows. It is possible, however, that the winds aloft will sometimes diminish from one altitude to another, and for this reason, a clutch means is provided between the rotor and the drive shaft, so that should the speed of any single rotor decrease to a rotational velocity which is less than the shaft speed, the rotor will become free wheeling and therefore offer negligible aerodynamic drag to the system.

The rotor design preferably takes on the form illustrated in FIG. 4 and is comprised of a vertical, axially aligned, central support in the form of a built-up, tubular, trussed-like structure, from where there is radially and supportingly disposed the three vertical blade members. The blades may extend 150 feet in length. The power shaft preferably passes through the interior of the central structure where it is attached thereto at a plurality of locations.

In each of the embodiments of the invention, the lower marginal shaft length can be provided with the before mentioned dampening balloons, which are used to dampen the oscillatory whipping motion which can occur in the suspended power shaft. The dampening balloons, together with the lifting bodies and the rotors, will tend to avoid or minimize any induced harmonic motion.

The present method of harvesting and transmitting wind energy includes the use of wind rotors mechanically attached to a flexible power shaft which causes the power shaft to rotate, thereby transmitting energy in the form of rotational torque from the atmosphere to a point of usage on the ground. The power shaft also tethers the apparatus. Where deemed desirable, the apparatus can be utilized to drive energy conversion apparatus other than an electrical generator; as for example, energy can be stored in a rotating flywheel, or used to drive a fluid pump means. The pump means can be utilized in pumping either the air or water, and the water can be directly consumed or, alternatively, it can be moved from a low elevation to a high elevation, thereby storing energy.

The term "flexible power shaft" is intended to embrace a hollow, solid, metal or non-metal elongated drive member having sufficient structural integrity to utilize the torque placed thereon by the wind rotors, and additionally to withstand the tension loads produced by the aggregation of lifting bodies. The power shaft should be selected so that it is as light in weight as possible, while staying within the confines of the above limitations.

Where deemed desirable, members 54 and 56 may include a gear system wherein the shaft is rotated several times as fast as the rotor device. For example, member 74 can drive a set of planetary gears which in turn drive members 76 at a rotational velocity which is considerably greater than the rotational velocity of the rotors. This expedient greatly reduces the required cross-sectional area of the shaft for a specific power transmission value.

We claim:

1. Apparatus for harvesting energy from high velocity winds found at great heights above the ground, comprising:

an elongated, relatively flexible drive shaft having opposed ends, a ground supported energy conversion device for generating power, a plurality of wind driven, vertical axis rotors for driving said shaft, each of said rotors having a plurality of blades circumferentially spaced about the vertical axis thereof for imparting rotational motion into each of said rotors, a shaft swivel means, and an aerial support means by which said swivel means can be supported within the atmosphere at a great height above said energy conversion device;

means connecting one end of said shaft to said energy conversion device such that rotation of said shaft operatively actuates said energy conversion device to thereby generate power; means connecting each of said rotors to said shaft with said shaft being received through the central axis of each of said rotors, thereby enabling the blades of each of said rotors to rotate about the vertical axis thereof while rotating said shaft; means by which said shaft is supported from said aerial support means by said shaft swivel means such that each of said rotors imparts relative rotational motion into said shaft respective to said aerial support means in response to the winds aloft blowing thereacross, said shaft being the sole means by which the aerial support means is tethered to the earth;

said means connecting said rotors to said shaft includes a one-way clutch means which causes a relatively slow rotating one of said rotors to be disengaged from the shaft when the wind causes a relatively fast rotating one of said rotors to rotate said shaft at a rotational speed greater than the speed of said slow rotating one of said rotors.

2. The apparatus of claim 1 wherein said aerial support means is a gas filled aerodynamic lifted body which provides a lifting force in proportion to the relative wind velocity flowing thereacross.

3. The apparatus of claim 1 wherein said aerial support means includes a plurality of lifting devices which are spaced at different elevations along said drive shaft.

4. Apparatus for harvesting energy from the winds aloft such as may be found at great heights above the ground, comprising:

a relatively flexible very long drive shaft means having a lower end portion and an upper end portion, a ground supported generator device for generating power, a plurality of wind driven vertical axis rotors for driving said shaft, each of said rotors having a plurality of blades circumferentially spaced about the vertical axis thereof for imparting rotational means of the blades about the longitudinal central axis of any one of said rotors when any of the rotors is subjected to the force of the winds aloft;

a shaft swivel means, an aerial support means in the form of a lighter than air lifting body; said swivel means being supported by said aerial support means;

means by which said upper end of said shaft is supported at a great height above said generator device by said swivel means with said shaft being the sole means by which said aerial support means is tethered to the ground;

means connecting the lower end of said shaft to said generator device such that rotation of said shaft operatively actuates said generator device to thereby generator power;

means, including a one-way clutch, by which at least one of said rotors are connected to said shaft, means connecting the other of said rotors to said shaft, so that said one of said rotors is disengaged from the shaft when the wind causes the other of said rotors to turn the shaft at a rotational velocity which is greater than the rotation velocity of said one of said rotors.

5. The apparatus of claim 4 wherein said aerial support means is a gas filled aerodynamic lifting body which provides a lifting force in proportion to the relative wind velocity flowing thereacross.

6. The apparatus of claim 4 wherein said aerial support means includes a plurality of lifting devices which are spaced at different elevations along said drive shaft.

7. Method of extracting energy from the winds aloft comprising the steps of:

supporting an energy conversion device for generating power upon the surface of the earth;

connecting one end of a very long, relatively flexible drive shaft to said energy conversion device such that rotation of said shaft about its central longitudinal axis enables useful energy to be derived from said energy conversion device;

suspending the other end of said drive shaft within the atmosphere by connecting said other end to an aerial support means such that said shaft is the sole means by which said aerial support means is tethered to the earth;

forming a plurality of vertical axis rotors which include radially spaced blades circumferentially disposed about the vertical axis of the rotor thereof; and, connecting said plurality of wind driven vertical axis rotors to turn said drive shaft about the longitudinal central axis thereof and positioning said rotors in spaced relationship along said drive shaft so that the rotors are suspended within the atmosphere;

disengaging a lower one of said rotors from said drive shaft when the winds aloft tend to cause an upper one of said rotors to turn said drive shaft at a rotational speed which is greater than the rotational speed of the lower rotor by interposing a one-way clutch means between a rotor and said drive shaft;

so that when the winds aloft drive said rotors, said rotors impart a rotational motion into said drive shaft to thereby provide a method by which wind energy is converted into another form of useful energy.

8. The method of claim 7 and further including the step of making said aerial support means into a gas filled lifting body.

* * * * *

UNITED STATES PATENT OFFICE
CERTIFICATE OF CORRECTION

Patent No. 4,084,102          Dated April 11, 1978

Inventor(s)  CHARLES MAX FRY and HENRY W. HISE

It is certified that error appears in the above-identified patent and that said Letters Patent are hereby corrected as shown below:

Column 2, line 18, "by" should read --to--;

Column 4, line 43, "driven" should read --drive--;

Column 7, line 66, "members" should read --member--;

Claim 1, Column 8, line 32, "the" second occurrence, should read --said--;

Claim 4, Column 8, line 58, "means" should read --motion--;

Signed and Sealed this

Twenty-fourth Day of October 1978

[SEAL]

Attest:

RUTH C. MASON
Attesting Officer

DONALD W. BANNER
Commissioner of Patents and Trademarks